United States Patent
Thacker

(10) Patent No.: US 10,807,899 B2
(45) Date of Patent: Oct. 20, 2020

(54) TEMPERATURE MEASUREMENT SYSTEM FOR BLANK MOLDS IN GLASSWARE FORMING MACHINES

(71) Applicant: Owens-Brockway Glass Container Inc., Perrysburg, OH (US)

(72) Inventor: Michael S. Thacker, Minonk, IL (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 220 days.

(21) Appl. No.: 16/196,857

(22) Filed: Nov. 20, 2018

(65) Prior Publication Data

US 2020/0156982 A1  May 21, 2020

(51) Int. Cl.
  C03B 9/41   (2006.01)
  G01K 7/04   (2006.01)
  C03B 9/353  (2006.01)
  C03B 11/16  (2006.01)

(52) U.S. Cl.
  CPC ............. C03B 9/41 (2013.01); C03B 9/353 (2013.01); C03B 11/16 (2013.01); G01K 7/04 (2013.01)

(58) Field of Classification Search
  None
  See application file for complete search history.

(56) References Cited

U.S. PATENT DOCUMENTS

| | | | |
|---|---|---|---|
| 3,666,433 A * | 5/1972 | Nebelung | C03B 9/3532 65/158 |
| 3,810,747 A | 5/1974 | Bork | |
| 4,448,600 A * | 5/1984 | Braithwaite | C03B 9/353 65/227 |
| 7,054,710 B2 | 5/2006 | Hartmann et al. | |
| 2011/0198013 A1* | 8/2011 | Christiansen | B29C 70/48 156/64 |
| 2012/0186301 A1* | 7/2012 | Nishimura | C03B 9/3891 65/162 |
| 2016/0170399 A1 | 6/2016 | Von Ah et al. | |
| 2018/0265389 A1 | 9/2018 | Flynn | |

FOREIGN PATENT DOCUMENTS

| | | |
|---|---|---|
| EP | 2484642 A1 | 8/2012 |
| FR | 2153005 A1 | 4/1973 |

OTHER PUBLICATIONS

Written Opinion & International Search Report for PCT/US2019/058707 dated Feb. 11, 2020, 14 pages.

* cited by examiner

*Primary Examiner* — Queenie S Dehghan

(57) ABSTRACT

A glassware forming machine includes a blank mold having first and second sections and a hanger assembly configured to support the first section and permit movement of the first section towards and away from the second section. A temperature measurement system for the first section includes a thermocouple configured to be received within a recess in a wall of the first section and to generate a temperature signal indicative of a temperature of the first section. The system further includes a transmitter assembly coupled to the thermocouple and comprising a housing supported on the hanger assembly and a wireless transmitter and controller disposed within the housing. The controller is configured to receive the temperature signal and generate an output signal in response for transmission by the wireless transmitter, the output signal including data indicative of the temperature of the first section of the blank mold.

18 Claims, 3 Drawing Sheets

TEMPERATURE MEASUREMENT SYSTEM FOR BLANK MOLDS IN GLASSWARE FORMING MACHINES

BACKGROUND OF THE INVENTION a. Field of the Invention

This invention relates to glassware forming machines. In particular, the invention relates to a temperature measurement system for blank molds in a glassware forming machine that provides continuous feedback on temperatures without manual intervention by operators.

b. Background Art

A conventional I.S. (individual section) machine for forming articles of glassware includes a set of blank molds in which gobs of glass are formed into glass blanks. In order to properly form the glass blanks, it is important to maintain consistent temperatures in the blank molds. Therefore, the temperatures of the molds are periodically measured and the amount of cooling air applied to the outside of the molds is adjusted if the measured temperature differs from a desired temperature.

One conventional method of measuring the temperatures in blank molds in a glassware forming machine is for a technician to insert a thermocouple into a blank mold and record the temperature. The technician then removes the thermocouple from the blank mold and moves to the next blank mold where the process is repeated. In another conventional method, a technician touches a measurement probe to an exterior surface of the blank mold and records the temperature and repeats this process for each successive blank mold in the glassware forming machine. Both of these conventional methods have several disadvantages. Both methods require the removal of safety barriers from around the glassware forming machine to allow the technician to reach the blank molds. Both methods also require a relatively large amount of time. As a result, the methods are performed only periodically (e.g., once a day or once a shift) thereby severely limiting the information provided and the ability to properly adjust the temperatures in the blank molds to ensure quality manufacturing. The method in which a measurement probe contacts the exterior surface of the blank mold also generates highly variable results and is therefore relatively inaccurate.

The inventor herein has recognized a need for a temperature measurement system for a glassware forming machine that will minimize and/or eliminate one or more of the above-identified deficiencies.

BRIEF SUMMARY OF THE INVENTION

This invention relates to glassware forming machines. In particular, the invention relates to a temperature measurement system for blank molds in a glassware forming machine that provides continuous feedback on temperatures without manual intervention by operators.

A glassware forming machine in accordance with one embodiment includes a blank mold having first and second sections. The machine further includes a hanger assembly configured to support the first section of the blank mold and to permit movement of the first section of the blank mold towards and away from the second section of the blank mold. The machine further includes a temperature measurement system for the first section of the blank mold. The temperature measurement system includes a thermocouple configured to be received within a recess in a wall of the first section of the blank mold and configured to generate a temperature signal indicative of a temperature of the first section of the blank mold. The temperature measurement system further includes a transmitter assembly coupled to the thermocouple and comprising a housing supported on the hanger assembly, a wireless transmitter disposed within the housing and a controller disposed within the housing. The controller is configured to receive the temperature signal and generate an output signal in response for transmission by the wireless transmitter, the output signal including data indicative of the temperature of the first section of the blank mold.

A glassware forming machine in accordance with another embodiment includes a plurality of blank molds, each of the plurality of blank molds having first and second sections. The machine further includes a hanger assembly configured to support the first sections of the plurality of blank molds and to permit movement of the first sections of the plurality of blank molds towards and away from the second sections of the plurality of blank molds. The machine further includes a temperature measurement system for the first sections of the plurality of blank molds. The temperature measurement system includes a plurality of thermocouples. Each of the plurality of thermocouples is configured to be received within a recess in a wall of the first section of one of the plurality of blank molds and is configured to generate a temperature signal indicative of a temperature of the first section of the one blank mold. The temperature measurement system further includes a transmitter assembly coupled to the plurality of thermocouples and comprising a housing supported on the hanger assembly, a wireless transmitter disposed within the housing and a controller disposed within the housing. The controller is configured to receive the temperature signal from each of the plurality of thermocouples and to generate a corresponding output signal in response for transmission by the wireless transmitter, the output signal including data indicative of the temperature of the first section of a corresponding blank mold of the plurality of blank molds.

A temperature measurement system for a glassware forming machine in accordance the present teachings represents an improvement as compared to conventional temperature measurement systems and methods. The system may be quickly installed in a glassware forming machine. After installation, the system provides continuous, and substantially real-time measurement of temperatures in each blank mold thereby allowing rapid adjustment of cooling air flow and improving the quality of manufactured products. The system also operates without further intervention by plant technicians thereby improving the consistency in results and the safety of the technicians. Finally, the system provides more accurate temperature measurements as compared to the conventional touch probe system.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
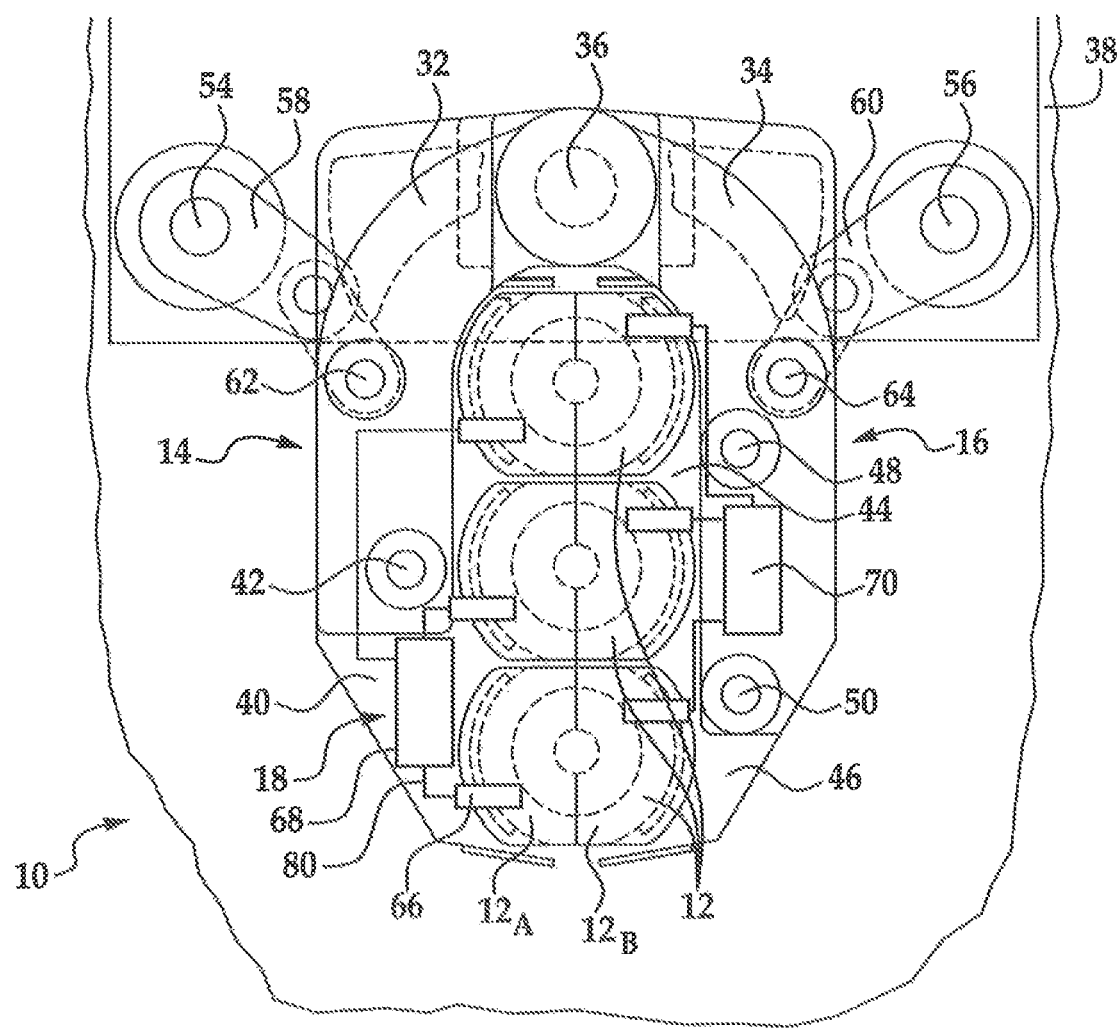
FIG. 1 is a plan view of part of a glassware forming machine incorporating portions of a temperature measurement system in accordance with one embodiment.

Referring now to the drawings wherein like reference numerals are used to identify identical components in the various views, FIG. 1 illustrates a portion of a glassware forming machine 10 in accordance with one embodiment. Machine 10 may comprise an I.S. (individual section) glass forming machine and may include a plurality of blank molds, systems for forming glass blanks within the blank molds (through either a press or blow operation), blow molds, systems for transferring the glass blanks from the blank molds to the blow molds and systems for blowing the glass blanks into a final form. In accordance with certain embodiments disclosed herein, machine 10 includes a plurality of blank molds 12, hanger assemblies 14, 16 and a temperature measurement system 18 used to monitor temperatures in molds 12.

Figure 2:
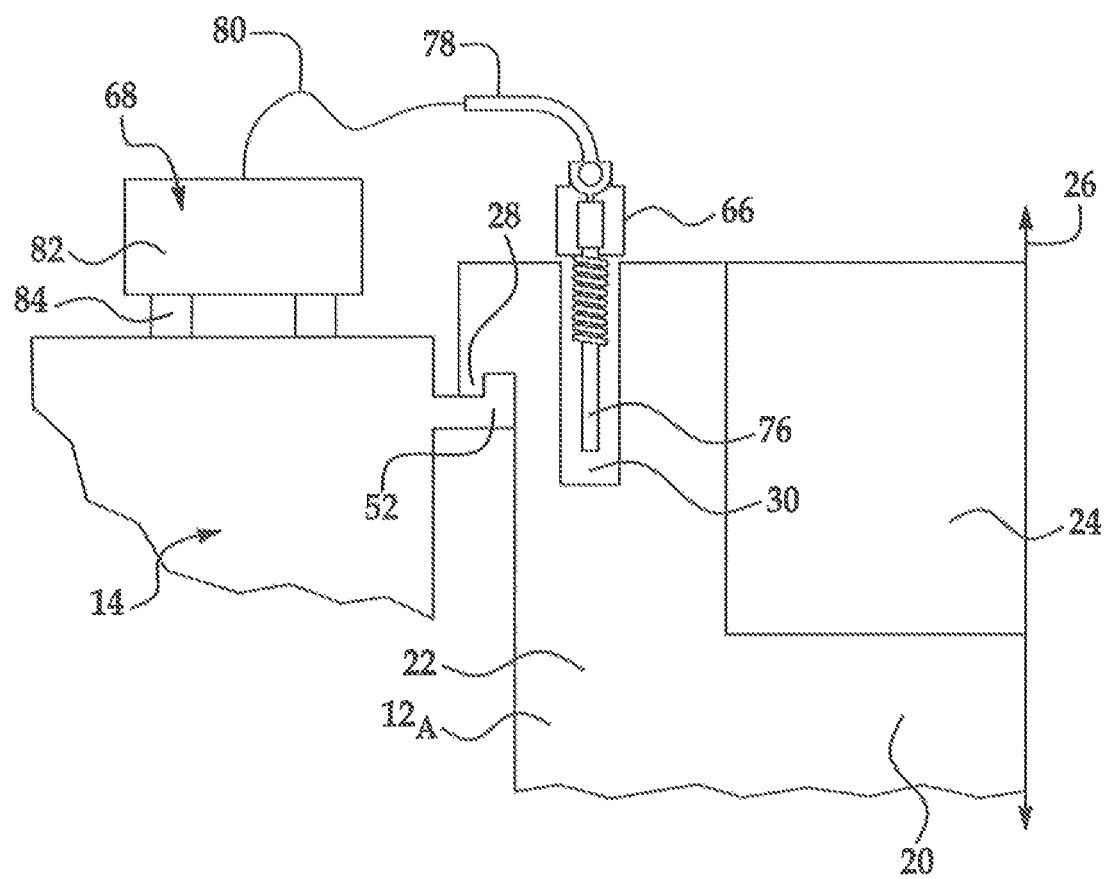
FIG. 2 is a cross-sectional view of a portion of the machine shown in FIG. 1.

Blank molds 12 are provided for use in forming glass blanks. Molds 12 are configured to receive a gob of molten glass that may be formed into a glass blank having a shape conforming to the shape of the mold 12 through a press or blow operation. The illustrated section of machine 10 includes three blank molds 12, but it should be understood that the number of molds 12 may vary. Each mold 12 is comprised of two sections $12_A$, $12_B$ (e.g., two halves), that may be joined together to form the glass blank and separated for removal of the glass blank. Referring to FIG. 2, each mold 12 includes a bottom wall 20 and a side wall 22 extending upward from bottom 20. The internal surfaces of walls 20 and 22 define a mold cavity 24 in which gobs of molten glass are deposited and glass blanks are formed. A center axis 26 of the mold 12 extends through cavity 24. The outer surfaces of walls 20 and 22 provided surfaces tor cooling air flow to regulate the temperature of mold 12. The outer surface of wall 22 further defines one or more hooks 28 configured to engage one of hanger assemblies 14, 16 as described in greater detail below. Wall 22 further defines one more recesses 30 that may be used to determine the current temperature of mold 12 as described in greater detail below.

Referring again to FIG. 1, hanger assemblies 14, 16 are provided to support sections $12_A$, $12_B$, respectively, of one or more molds 12 and to permit movement of the sections $12_A$, $12_B$ towards and away from one another. Assemblies 14, 16 also provide a manifold for delivery and circulation of cooling air about molds 12. Assemblies 14, 16 include arms 32, 34, respectively, that are pivotally supported on a center post 36 extending from a base 38. Arm 32 pivotally supports a mold holder 40 through pin 42 while arm 34 pivotally supports a pair of mold holders 44, 46 through pins 48, 50. Mold holder 40 supports section $12_A$ for each of molds 12. Mold holders 44, 46 each support section $12_B$ for a subset of molds 12. Referring to FIG. 2, each molder holder 40, 44, 46 defines an arcuate ledge 52 configured to receive hooks 28 on molds 12 such that molds 12 are hung from, or suspended from, holders 40, 44, 46 of assemblies 14, 16. Referring again to FIG. 1, arms 32, 34 and mold holders 40, 44, 46 may each define various voids and hollows that form a manifold for delivery of cooling air to the external surfaces of mold 12. Arms 32, 34 are actuated by rotation of shafts 54, 56 which are connected to arms 32, 34 through linkages 58, 60 and pins 62, 64, respectively. Rotation of shafts 54, 56 causes pivotal movement of arms 32, 34 about post 36 to move the mold sections $12_A$, $12_B$ towards and away from one another.

Figure 3:
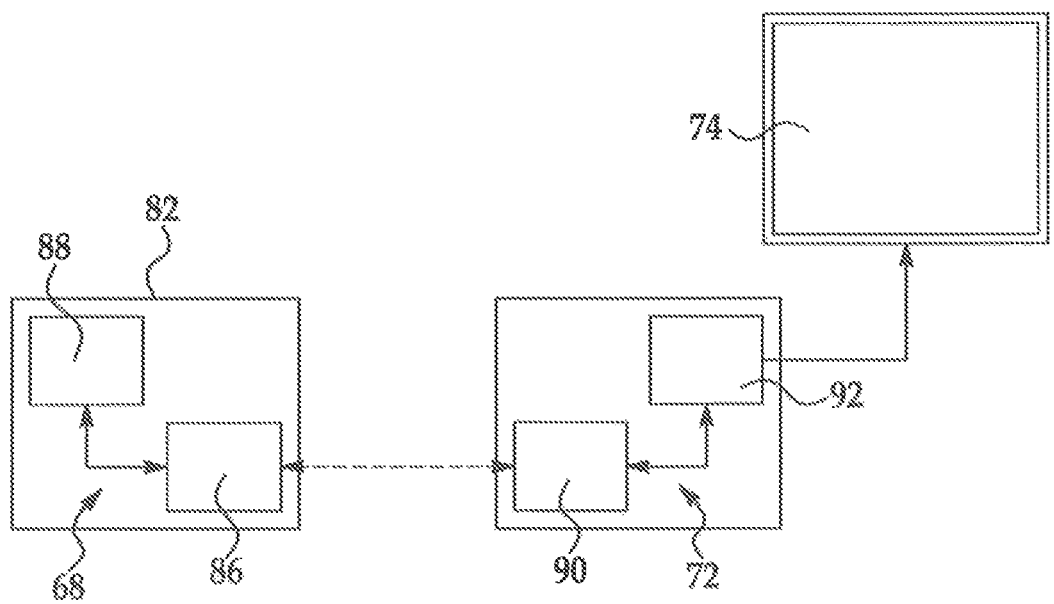
FIG. 3 is a diagrammatic view of a portion of a temperature measurement system for a glassware forming machine in accordance with certain embodiments.

Temperature measurement system 18 is provided to measure the temperature in each blank mold 12 of machine 10. System 18 may include a plurality of thermocouples 66 and one or more transmitter assemblies 68, 70. Referring to FIG. 3, system 18 may further include a wireless receiver assembly 72 and one or more displays 74.

Referring again to FIGS. 1-2, thermocouples 66 are provided to measure the temperature in each section $12_A$, $12_B$ of each blank mold 12. Referring to FIG. 2, each thermocouple 66 is configured to be received within recess 30 in wall 22 of a corresponding blank mold section $12_A$, $12_B$ and to generate a temperature signal indicative of the temperature of that section $12_A$, $12_B$. Each thermocouple 66 includes a housing that is bent or curved such that the longitudinal ends 76, 78 of the housing are not aligned. In particular, the housing is formed such that longitudinal end 76 of the thermocouple 66 may be disposed within recess 30 and a portion of the thermocouple 66 may extend in a direction generally parallel to axis 26 while end 78 is disposed outside of recess 30 in a portion of the thermocouple 66 that extends away from axis 26. This configuration allows placement of end 78 away from high temperature areas of the machine 10 and blank molds 12 where end 78 may be coupled to an insulated lead wire 80 that extends from thermocouple 66 to transmitter assembly 68.

Referring again to FIG. 1, transmitter assemblies 68, 70 transmit information obtained from, or derived from, thermocouples 66 to another location. Assembly 68 is configured to transmit information from thermocouples 66 measuring temperatures in sections $12_A$ of blank molds 12 while assembly 70 is configured to transmit information from thermocouples 66 measuring temperatures in sections $12_B$ of blank molds 12. Assemblies 68, 70 are coupled to thermocouples 66 through wires 80. Assemblies 68, 70 are supported on portions of hanger assemblies 14, 16, respectively. In the illustrated embodiment, assembly 68 is supported on mold holder 40 of hanger assembly 14 while assembly 70 is supported on arm 34 of hanger assembly 16. It should be understood, however, that the exact placement of transmitter assemblies 68, 70 on hanger assemblies 14, 16 may vary depending on the dimensions of transmitter assemblies 68, 70 and hanger assemblies 14, 16, other structures disposed near hanger assemblies 14, 16, anticipated operating temperatures for machine 10, and other factors. Referring to FIGS. 2-3, each transmitter assembly 68, 70 may include a housing 82, means, such as magnets 84, tor coupling housing 82 to a corresponding hanger assembly 14, 16, a wireless transmitter 86, and a controller 88.

Referring to FIG. 2, housing 82 is supported on a corresponding hanger assembly 14 or 16 and provides structural support for and orients the other components of transmitter assembly 68 or 70 such as transmitter 86 and controller 88. Housing 82 also provides protection for transmitter 86 and controller 88 from external elements and objects. Housing 82 may be made from aluminum or polymeric materials capable of withstanding relatively high temperatures. Housing 82 may include openings configured to receive one end of each wire 80 from a thermocouple 66 or may include external electromechanical connectors configured to mate with a corresponding connect at the end of wire 80.

Magnets 84 provide a means for releasably coupling housing 82 to hanger assembly 14 or 16. In one embodiment, housing 82 has a shape generally in the form of a rectangular prism and four magnets 84 are disposed between a bottom wall of housing 82 and a corresponding one of hanger assemblies 14, 16 proximate the corners of housing 82. Magnets 84 may be configured to withstand relatively high temperatures present in machine 10 and near blank molds 12.

Referring to FIG. 3, transmitter 86 is disposed within housing 82 and transmits information from assembly 68 or 70 to another location. Transmitter 86 is configured for long range wireless communication with receiver assembly 72 and may operate at a frequency of 2.4 GHz and employ direct-sequence spread spectrum (DSSS) modulation to reduce signal interference. Transmitter 86 may include any combination of hardware, software and/or other components that enable wireless data communication between transmitter 86 and long range wireless communication devices. In accordance with some embodiments, transmitter 86 is a part of a wireless transceiver that is also capable of receiving wireless transmissions from receiver assembly 72 or another source.

Controller 88 is also disposed within housing 82 and is configured to receive temperature signals from thermocouples 66 and to generate output signals in response for transmission by transmitter 86. The output signals include data indicative of the temperatures sensed by thermocouples 66 for sections $12_A$, $12_B$ of blank molds 12 and may include addressing and error detection and correction data among other data. Controller 88 may comprise a programmable microprocessor or microcontroller or may comprise an application specific integrated circuit (ASIC). Controller 88 may include a memory and a central processing unit (CPU). Controller 88 may also include an input/output (I/O) interface including a plurality of input/output pins or terminals through which controller 88 may receive a plurality of input signals and transmit a plurality of output signals. The input signals may include signals received from thermocouples 66 while the output signals may include signals transmitted to transmitter 86.

Receiver assembly 72 is provided to receive the temperature data transmitted by transmitter assemblies 68, 70 and to disseminate that data. Receiver assembly 72 may be configured to receive temperature data from multiple transmitter assemblies including assemblies 68, 70 and transmitter assemblies for other blank molds within machine 10. In one constructed embodiment, assembly 72 is configured to receive temperature data generated by up to two hundred (200) different thermocouples 66. Assembly 72 may be located away from machine 10 or at least from the portion of machine 10 including blank molds 12. Assembly 72 may include a gateway for use in interfacing with a telecommunications network and translating the data received from transmitters assemblies 68, 70 for use on that network. The gateway may include a wireless receiver 90 and a controller 92 among other components (e.g., an ethernet or USB interface for connection to an appropriate telecommunications network).

Receiver 90 is configured to receive the output signals from transmitters assemblies 68, 70 and to provide data from these signals to controller 92. Receiver 90 is configured for long range wireless communication with transmitter assemblies 68, 70 and may operate at a frequency of 2.4 GHz and employ direct-sequence spread spectrum (DSSS) modulation to reduce signal interference. Receiver 90 may include any combination of hardware, software and/or other components that enable wireless data communication between receiver 90 and long range wireless communication devices. As with transmitter 86, in accordance with some embodiments receiver 90 is a part of a wireless transceiver that is also capable of transmitting wireless transmission to transmitter assemblies 68, 70 or another destination.

Controller 92 is coupled to receiver 90 and is configured to receive data from transmitters 86 and to organize that data for transmission to, and use by, other systems. These systems may include displays 74 as discussed in greater detail below and control systems such as those used in regulating the flow of cooling air to blank molds 12. Controller 92 may also be configured to process data received from transmitter assemblies 68, 70 through receiver 90 before transmission to other systems. Where transmitters 86 and receiver 90 form parts of transceivers, controller 92 may also be configured to generate commands for transmission through a transceiver containing receiver 90 to a transceiver containing transmitter 86 of transmission assemblies 68, 70. In one embodiment, controller 92 is configured to generate a sampling rate command for transmission to controller 88 of transmitter assembly 68 or 70 to establish a sampling rate for signals generated by thermocouples 66. Controller 92 may again comprise a programmable microprocessor or microcontroller or may comprise an application specific integrated circuit (ASIC). Controller 92 may include a memory and a central processing unit (CPU). Controller 92 may also include an input/output (I/O) interface including a plurality of input/output pins or terminals through which controller 92 may receive a plurality of input signals and transmit a plurality of output signals. The input signals may include signals received from receiver 90 or a networked device while the output signals may include signals transmitted to receiver 90 for transmission to transmitters assemblies 68, 70 (such as the aforementioned sampling rate command) and output signals to displays 74, control systems, or other networked systems.

Figure 4:
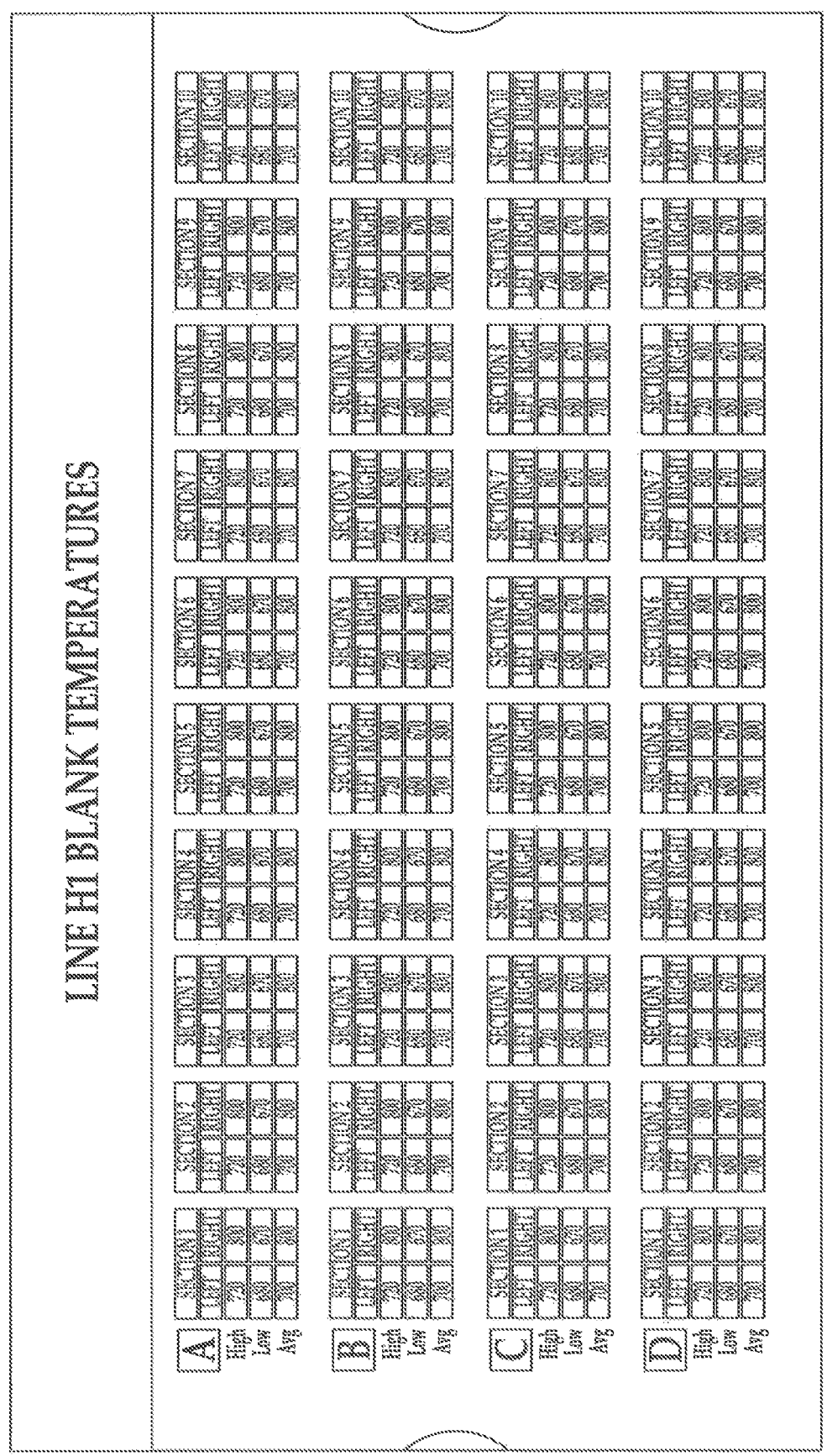
FIG. 4 is a screen display illustrating one embodiment of an output of the temperature measurement system shown in FIGS. 1-3.

Displays 74 are provided to display data obtained from, or derived from, thermocouples 66. Displays 74 may comprise conventional liquid crystal, plasma, or light emitting diode (LED) displays. Displays 74 are in communication with receiver assembly 72 and may form part of a telecommunications network with assembly 72. Displays 74 are configured to display the temperatures of sections $12_A$, $12_B$ of blank molds 12 measured by temperature measurement system 18. Referring to FIG. 4, in accordance with one embodiment, display 74 may be configured to display temperatures from a plurality of blank molds 12 (designated as A-D) in each individual section of a machine 10 (designated as Sections 1-10). Display 74 may further display values for each section $12_A$, $12_B$ (designated as "left" and "right") of each mold 12 in each individual section of machine 10 including high and low temperature readings over a predetermined period of time and an average reading over the same period of time or a different period of time. Display 74 may further be configured to alter the appearance of any of the displayed temperatures responsive to the value of the temperature. For example, if the value of a low or high temperature reading meets a predetermined condition relative to a predetermined threshold temperature (e.g., indicating that a temperature is too low or too high for effective production of glassware items), display 74 may be configured to change the color of the displayed temperature or provide another visual indication that the condition has been met.

A temperature measurement system 18 for a glassware forming machine 10 in accordance the present teachings represents an improvement as compared to conventional temperature measurement systems and methods. The system 18 may be quickly installed in a glassware forming machine 10. After installation, the system 18 provides continuous, and substantially real-time measurement of temperatures in each blank mold 12 thereby allowing rapid adjustment of cooling air flow and improving the quality of manufactured products. The system 18 also operates without further intervention by plant technicians thereby improving the consistency in results and the safety of the technicians, Finally, the system 18 provides more accurate temperature measurements as compared to the conventional touch probe system.

While the invention has been shown and described with reference to one or more particular embodiments thereof, it will be understood by those of skill in the art that various changes and modifications can be made without departing from the spirit and scope of the invention.

What is claimed is:

1. A glassware forming machine, comprising:
   a first blank mold having first and second sections;
   a first hanger assembly configured to support the first section of the blank mold and to permit movement of the first section of the blank mold towards and away from the second section of the blank mold;
   a temperature measurement system for the first section of the blank mold, comprising
      first thermocouple configured to be received within a recess in a wall of the first section of the blank mold and configured to generate a first temperature signal indicative of a temperature of the first section of the blank mold; and,
      a first transmitter assembly coupled to the first thermocouple and comprising
         a first housing supported on the first hanger assembly;
         a first wireless transmitter disposed within the first housing; and,
         a first controller disposed within the first housing, the first controller configured to receive the first temperature signal and generate an output signal in response for transmission by the first wireless transmitter, the output signal including data indicative of the temperature of the first section of the blank mold.

2. The glassware forming machine of claim 1, further comprising:
   a second hanger assembly configured to support the second section of the blank mold and to permit movement of the second section of the blank mold towards and away from the first section of the blank mold;
   a temperature measurement system for the second section of the blank mold, comprising
      a second thermocouple configured to be received within a recess in a wall of the second section of the blank mold and configured to generate a second temperature signal indicative of a temperature of the second section of the blank mold; and,
      a second transmitter assembly coupled to the second thermocouple and comprising
         a second housing supported on the second hanger assembly;
         a second wireless transmitter disposed within the second housing; and,
         a second controller disposed within the second housing, the second controller configured to receive the second temperature signal and generate an output signal in response for transmission by the second wireless transmitter, the output signal including data indicative of the temperature of the second section of the blank mold.

3. The glassware forming machine of claim 1 wherein the blank mold is disposed about a central axis and the first thermocouple has a first longitudinal end disposed within the recess in the first section of the blank mold and extending in a direction parallel to the central axis and a second longitudinal end disposed outside of the recess in the first section of the blank mold and extending in a direction away from the central axis, the second longitudinal end coupled to the first transmitter assembly.

4. The glassware forming machine of claim 1 wherein the first housing is magnetically coupled to the first hanger assembly.

5. The glassware forming machine of claim 4 wherein the first housing includes a plurality of magnets disposed between the first housing and the first hanger assembly.

6. The glassware forming machine of claim 1 wherein the temperature measurement system further includes a first receiver assembly including:
   a wireless receiver configured to receive the output signal of the first transmitter assembly; and,
   a controller coupled to the wireless receiver.

7. The glassware following machine of claim 6 wherein the first wireless transmitter comprises a first wireless transceiver, the wireless receiver comprises a second wireless transceiver and the controller of the first receiver assembly is configured to generate a sampling rate command for transmission to the first controller of the first transmitter assembly through the first and second wireless transceivers.

8. The glassware forming machine of claim 6 wherein the temperature measurement system further comprises a display in communication with the first receiver assembly and configured to display the temperature of the first section of the blank mold measured by the temperature measurement system.

9. The glassware forming machine of claim 8 wherein an appearance of the temperature on the display varies responsive to a value of the temperature.

10. A glassware forming machine, comprising:
    a plurality of blank molds, each of the plurality of blank molds having first and second sections;
    a first hanger assembly configured to support the first sections of the plurality of blank molds and to permit movement of the first sections of the plurality of blank molds towards and away from the second sections of the plurality of blank molds;
    a temperature measurement system for the first sections of the plurality of blank molds, comprising
       a first plurality of thermocouples, each of the first plurality of thermocouples configured to be received within a recess in a wall of the first section of one of the plurality of blank molds and configured to generate a first temperature signal indicative of a temperature of the first section of the one blank mold; and,
       a first transmitter assembly coupled to the first plurality of thermocouples and comprising
          a first housing supported on the first hanger assembly;
          a first wireless transmitter disposed within the first housing; and,
          a first controller disposed within the first housing, the first controller configured to receive the first temperature signal from each of the first plurality of thermocouples and generate a corresponding output signal in response for transmission by the first wireless transmitter, the output signal including data indicative of the temperature of the first section of a corresponding blank mold of the plurality of blank molds.

11. The glassware forming machine of claim 10, further comprising:
a second hanger assembly configured to support the second sections of the plurality of blank molds and to permit movement of the second sections of the plurality of blank molds towards and away from the first sections of the plurality of blank molds;
a temperature measurement system for the second sections of the plurality of blank molds, comprising
a second plurality of thermocouples, each of the second plurality of thermocouples configured to be received within a recess in a wall of the second section of one of the plurality of the blank molds and configured to generate a second temperature signal indicative of a temperature of the second section of the one blank mold; and,
a second transmitter assembly coupled to the second plurality of thermocouples and comprising
a second housing supported on the second hanger assembly;
a second wireless transmitter disposed within the second housing; and,
a second controller disposed within the second housing, the second controller configured to receive the second temperature signal from each of the second plurality of thermocouples and generate a corresponding output signal in response for transmission by the second wireless transmitter, the output signal including data indicative of the temperature of the second section of a corresponding blank mold of the plurality of blank molds.

12. The glassware forming machine of claim 10 wherein each of the plurality of blank molds is disposed about a central axis and each of the first plurality of thermocouples has a first longitudinal end disposed within the recess in the first section of a corresponding one of the plurality of blank molds and extending in a direction parallel to the central axis and a second longitudinal end disposed outside of the recess in the first section of the corresponding blank mold and extending in a direction away from the central axis, the second longitudinal end coupled to the first transmitter assembly.

13. The glassware forming machine of claim 10 wherein the first housing is magnetically coupled to the first hanger assembly.

14. The glassware forming machine of claim 13 wherein the first housing includes a plurality of magnets disposed between the first housing and the first hanger assembly.

15. The glassware forming machine of claim 10 wherein the temperature measurement system further includes a first receiver assembly including:
a wireless receiver configured to receive the output signals of the first transmitter assembly; and,
a controller coupled to the wireless receiver.

16. The glassware forming machine of claim 15 wherein the first wireless transmitter comprises a first wireless transceiver, the wireless receiver comprises a second wireless transceiver and the controller of the first receiver assembly is configured to generate a sampling rate command for transmission to the first controller of the first transmitter assembly through the first and second wireless transceivers.

17. The glassware forming machine of claim 15 wherein the temperature measurement system further comprises a display in communication with the first receiver assembly and configured to display the temperatures of the first sections of the plurality of blank molds measured by the temperature measurement system.

18. The glassware forming machine of claim 17 wherein an appearance of each one of the temperatures on the display varies responsive to a value of the one temperature.

\* \* \* \* \*